March 23, 1965 G. R. HOFFMAN ETAL 3,175,200

DATA STORAGE APPARATUS

Filed June 24, 1960

Inventors: George Richard Hoffman
John Alan Turner
By: Stevens, Davis, Miller & Mosher

1

3,175,200
DATA STORAGE APPARATUS
George Richard Hoffman, Sale, England, and John Alan Turner, Pen-y-Groes, Caernarvon, North Wales, assignors, by mesne assignments, to International Business Machines Corporation, New York, N.Y., a corporation of New York
Filed June 24, 1960, Ser. No. 38,480
Claims priority, application Great Britain, June 29, 1959, 22,273
5 Claims. (Cl. 340—174)

Figure 1:
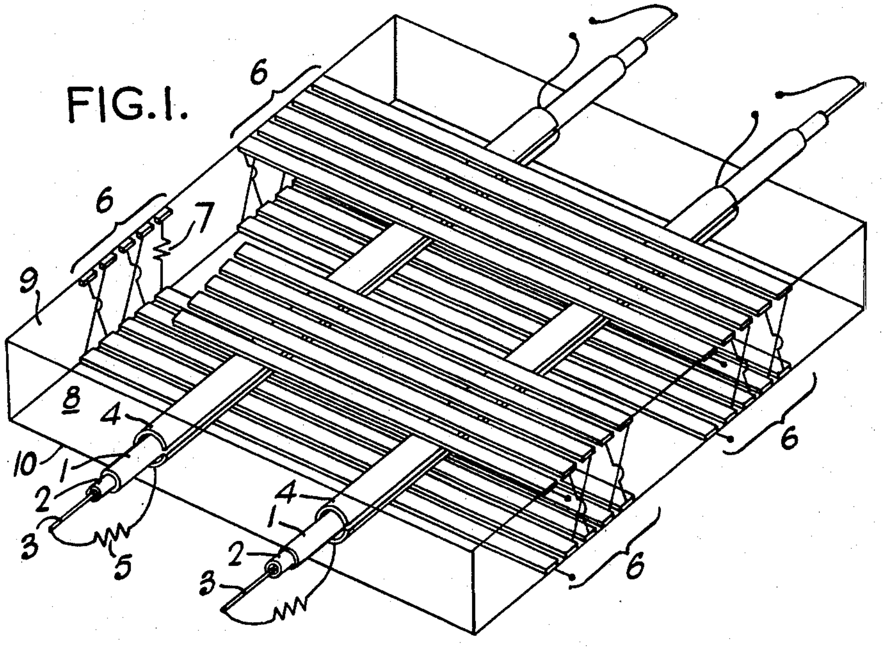

This invention relates to data storage apparatus and more particularly to such apparatus of the kind described in the specification of co-pending patent application Serial No. 798,722.

In the latter specification there is described a device comprising a hollow cylinder formed from a thin film of magnetic material, having one conductor threading the cylinder in an axial direction and another conductor passing around the cylinder in a circumferential direction.

These devices may be readily formed into a data store of the matrix type comprising an array of cylinders arranged in columns, defined by a number of axial or column conductors each common to a different column, and rows defined by a number of circumferential or row conductors each common to a different row. Thus each cylinder may be identified by a unique column conductor and row conductor.

In the use of such a device an element of information may be stored by means of a remanent magnetic field in the magnetic film, lying in one or other of the two possible circumferential directions, the particular direction corresponding to the binary significance of the element so stored. Recording and reproduction of an element of information in a specific cylinder may be achieved by the application to that cylinder of various magnetic fields in a circumferential sense or axial sense by means of current pulses in its corresponding axial and circumferential conductors, respectively.

In the case of a matrix type store of the above kind it has been proposed that the row conductor be in the form of a single loop embracing the cylinders of the row or where a large axial magnetic field is required a succession of series-connected coils wound on successive cylinders of the row.

However in the latter case it is found that in practice the delays resulting from the inherent inductive and capacitative effects are unduly limiting where high speed operation is desired and short duration current pulses are employed. This is particularly so in the case of the row conductors since in the preferred mode of operation comparatively large magnetic fields are required so that the above-described second method of constructing the row conductors is employed. Furthermore the actual construction of such conductors in the form of series-connected rows of coils is a tedious manual task.

One object of the present invention is to provide a practical arrangement for a matrix store of the above kind wherein the above difficulties are reduced.

Thus, according to the present invention there is provided a data storage apparatus comprising a plurality of hollow cylinders formed of magnetic material and arranged in an array of columns and rows, a plurality of column conductors each threaded axially through the cylinders of a different column, and a plurality of balanced pair transmission line structures at least one of which embraces each of said rows.

2

By the expression "balanced pair transmission line structure" used above and in the claims, is meant a pair of substantially parallel spaced conductors forming a two-conductor signal transmission path having substantially uniform distributed reactance characteristics throughout its length.

According to a feature of the present invention a group of such structures embraces each of said rows, the structures of each group being series-connected in such a way that on propagating an input signal along any group the resultant magnetic vector of each structure of that group lies in the same direction.

It will be seen hereinafter that by the use of this feature a desired axial magnetic force in a row of cylinders may be generated by use of a smaller current input pulse than would be the case with a single open pair transmission line structure embracing each row.

According to a further feature of the present invention each column conductor is in the form of the central conductor of a coaxial pair transmission line where the outer conductor embraces the cylinders of the associated column.

Figures 2, 3:
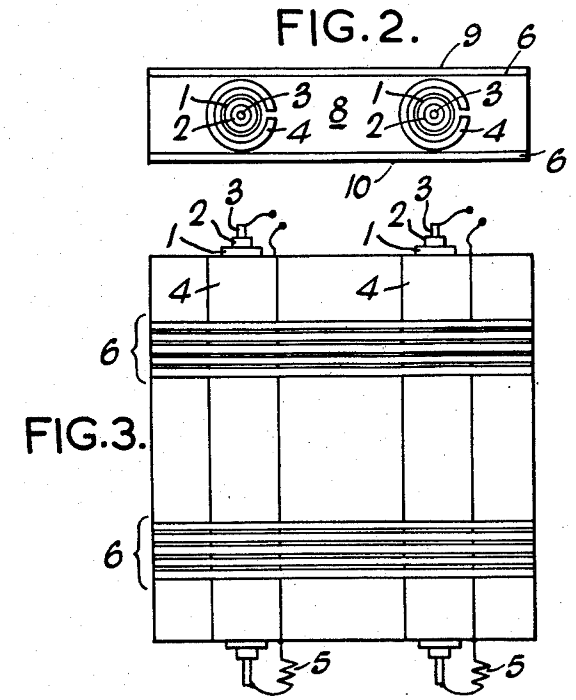
Figure 4:
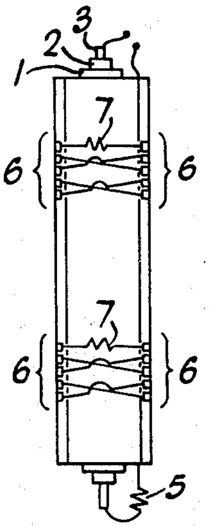

In order that the present invention may be clearly understood and readily carried into effect, the same will now be more fully described by way of example with reference to the accompanying drawings in which:

FIGURE 1 illustrates one embodiment or a matrix store according to the invention, FIGURE 2 is a side elevation of the embodiment of FIGURE 1, FIGURE 3 is a plan view of the embodiment of FIGURE 1, and FIGURE 4 is a further side elevation of the embodiment of FIGURE 1.

The store illustrated comprises a number of parallel columns of magnetic cylinders each column being formed by evaporating a thin film of magnetic material 1 on to a glass tube 2, as described in the above-mentioned specification.

These columns are aligned in a parallel planar array with corresponding cylinders of each column similarly disposed so as to form rows of cylinders.

Each tube 2 has a column conductor 3 passing axially therethrough and is also embraced by a conductor 4 of tubular form coaxially aligned with the tube 2 and thus the conductor 3. Corresponding pairs of conductors 3 and 4 thus form coaxial transmission line structures and each such pair is appropriately terminated at one end by means of a suitable resistance 5, as shown.

The outer conductors 4 act as electrostatic screens for their corresponding column conductors 3 and in this example each is provided with a slit along its length in the plane in which the columnar axes lie, these slits being for the purpose of reducing eddy currents.

The row conductors are formed by pairs of parallel conductors 6 disposed in planes parallel to that of the columns so as to embrace the columnar structure. The row conductors 6 are at right angles to the direction of the columnar structures.

A group of pairs of conductors 6 is associated with each row, the neighboring pairs of each group being cross-coupled at one end to form a multiple group of transmission line structures connected in series to form a continuous transmission line terminated by a suitable resistance 7. By virtue of the cross-coupling between successive pairs of conductors of the line the resultant magnetic vectors between these successive pairs, due to an input signal transmitted along the line, lie in the same direction.

In practice the duration of applied input signals is significantly longer than the overall transmission time of the multiple group so that the magnetic vectors effectively exist simultaneously over the whole length of the multiple group for the major part of the signal.

In one example, such a multiple group transmission line consisting of nine pairs of conductors of 2 mm. width, spacing 1.6 mm. was constructed to produce a magnetic field of 56 oersteds/ampere. This line was terminated in 200 ohms. It responded well to a current drive pulse of 0.1 microsecond duration whereas the transmission time along the line was only a few milli-microseconds. The comparison of the duration involved in the latter example clearly illustrates that the total magnetic effect may readily be considered as a steady state effect over substantially the whole duration of the input pulse although the effect is really being propagated along the line.

The electric vector between each of the pairs of row conductors 6 gives rise to virtually no interference on the column conductors 3 due to the interposed tubular conductors 4 which act as electrostatic screens. The slits in these screens reduce circulation of eddy currents whilst at the same time they do impair the screening effect since the electric vector between the row conductor pairs is perpendicular to the plane in which these slits are disposed.

In the practical construction of the above embodiment it is found convenient to employ a support block 8 for the various elements. This support block 8 is in the form of a non-conductive, non-magnetic, rectangular slab having a set of parallel holes through the block with their axes lying in a plane parallel with the upper and lower faces 9 and 10. The support block 8 is shown by outline only in the drawings for the sake of clarity.

One method employed for manufacturing a suitable support is to form a moulding frame just larger than the required support size and wires are then stretched across this frame in a parallel planar array. The wires when stretched become straight and are arranged to be of the same diameter as the external diameter of the electrostatic screen 4.

A plastic resin is then put into the frame around these wires and allowed to harden. After the resin has set the embedded wires are stretched further, without exceeding their yield point, so that they may be withdrawn from the resin slab. To facilitate this withdrawal the wires may be coated with a suitable parting agent. Alternatively, it has been found that if rather poorly insulated wire is used then on stretching the wires further the insulation coating breaks down to allow withdrawal of the wires.

After withdrawal of the wires the support is accurately machined to its required outside dimensions to have plane upper and lower surfaces 9 and 10 parallel to the plane of the holes, by securing the support with reference to the holes.

Also, at this stage, the upper and lower surfaces are preferably grooved for disposition of the transmission lines as shown in FIGURE 4. Thus, the transmission line conductors may be placed as close to the screens as possible, without actually being in electrical contact with them, to obtain a more concentrated magnetic field. Also a very accurate geometrical lay-out may be obtained.

In a simpler method these grooves are moulded into the support block in the initial stages by the use of suitable formers in the frame.

The transmission line conductors themselves may be made of wire or strip material or, alternatively, they may be printed by any suitable conventional method.

In one embodiment of the invention it was found that undesirable effects could arise as a result of inter-line capacities between neighboring elements of each multiple group transmission line structure. These effects were satisfactorily reduced by maintaining a suitable spacing between these elements. For this purpose comparatively heavy, or double insulated wire was used to form these elements to obtain a predetermined spacing therebetween. This also results in a further simplification in as far as only one groove is required in each face of the support for each multiple group transmission line structure.

The electrostatic screens may be formed by placing copper strip between templates and appropriately reducing the copper to conform the templates and so obtain accurately sized strips. These strips are thereafter moulded around stretched wire of suitable diameter to produce straight split copper tubes of such diameter as to fit snugly in the holes of the support slab.

Alternatively these screens are placed around the stretched wires in the frame before moulding the resin, the wires being coated with a parting agent and withdrawn after setting of the resin. This operation is somewhat simpler and also ensures a perfect fit for the screens in the support block.

As stated earlier the magnetic cylinders are deposited on their glass supporting tubes by evaporation technique as described in the above-mentioned specification. In fact, each tube is wholly coated on its outside and this coating is etched away to leave discrete cylinders. Alternatively, discrete cylinders are not produced and the spacing of the transmission line groups is arranged to be such that the magnetic field of each group is effective only on similarly disposed discrete lengths of each tube coating.

One of the advantages afforded by apparatus according to the present invention is that the structure permits a very accurate geometrical lay-out to be produced whereby operational limits arising from inductive and capacitive effects are made far less severe. Also, the use of transmission lines for the row conductors permits much higher speed operation to be contemplated, which speed would not otherwise be possible since the rate of build up of magnetic fields in the apparatus would be so slow as to make the use of short duration pulses pointless. Furthermore, as shown above the transmission line conductors may be printed thus resulting in straightforward and very accurate manufacture.

What is claimed is:

1. Data storage apparatus comprising a block of insulating material, bores in said block, a set of hollow cylinders of magnetic material forming a column in each of said bores, an axial conductor threading the cylinders of each of said columns, an outer cylindrical conductor embracing the cylinders of each of said columns and a plurality of balanced pair transmission line structures, the conductors of which form a parallel array on each face of said block embracing each row of cylinders formed by the corresponding cylinders of said columns.

2. Apparatus as claimed in claim 1 wherein the conductors embracing the rows of cylinders are set in grooves formed on the faces of said block.

3. Apparatus as claimed in claim 1, wherein the cylinders of magnetic material forming a column are formed as a continuous length, individual storage elements being identified by the associated row transmission lines.

4. Data storage apparatus comprising a plurality of hollow elongated closed flux path magnetic elements having axial and peripheral dimensions and arranged in a matrix formation, comprising an array of columns and rows, a plurality of transmission line structures at least one of which embraces each of said rows, a plurality of column conductor pairs arranged axially to the elements of a different column, each such column conductor pair having its first conductor passing through the hollows of said elongated closed flux path magnetic elements inside the periphery and having its second conductor substantially covering said magnetic material around the periphery essentially coaxial to said first conductor.

5. Data storage apparatus according to claim 4 wherein said second conductor of said column conductor pair is noncontinuous in the peripheral dimension.

References Cited by the Examiner

UNITED STATES PATENTS

| | | | |
|---|---|---|---|
| 2,792,563 | 5/57 | Rajchman | 340—174 |
| 2,811,652 | 10/57 | Lipkin | 340—174 |
| 3,060,410 | 10/62 | Wanlass | 340—174 |

OTHER REFERENCES

Session VIII: Switching Circuits II, by Schwartz et al., February 1959.

Electronic Design, page 35, April 1959.

Recent Advances in Magnetic Devices for Computers, by D. H. Looney, in Journal of Applied Physics, pages 38S–42S, April 1959.

Millimicrosecond Magnetic Switching and Storage Element, by D. A. Meier, in Journal of Applied Physics, pages 45S–46S, April 1959.

References Cited by the Applicant

UNITED STATES PATENTS

| | | |
|---|---|---|
| 3,030,612 | 4/62 | Rubens et al. |

FOREIGN PATENTS

| | | |
|---|---|---|
| 901,839 | 7/62 | Great Britain. |

IRVING L. SRAGOW, *Primary Examiner.*

EVERETT R. REYNOLDS, *Examiner.*